US007870610B1

(12) United States Patent
Mitchell et al.

(10) Patent No.: US 7,870,610 B1
(45) Date of Patent: Jan. 11, 2011

(54) DETECTION OF MALICIOUS PROGRAMS

(75) Inventors: John C. Mitchell, Stanford, CA (US); Elizabeth A. Stinson, Palo Alto, CA (US)

(73) Assignee: The Board of Directors of the Leland Stanford Junior University, Palo Alto, CA (US)

( * ) Notice: Subject to any disclaimer, the term of this patent is extended or adjusted under 35 U.S.C. 154(b) by 962 days.

(21) Appl. No.: 11/687,392

(22) Filed: Mar. 16, 2007

(51) Int. Cl.
*G06F 12/14* (2006.01)

(52) U.S. Cl. .............................. 726/23; 726/22; 726/25

(58) Field of Classification Search .............. 726/22–25
See application file for complete search history.

(56) References Cited

U.S. PATENT DOCUMENTS

| 7,284,273 | B1 * | 10/2007 | Szor ............................. 726/24 |
| 7,308,648 | B1 * | 12/2007 | Buchthal et al. ............ 715/234 |
| 2004/0158725 | A1 * | 8/2004 | Szor ............................ 713/188 |
| 2004/0196486 | A1 * | 10/2004 | Uchino ....................... 358/1.14 |
| 2005/0193429 | A1 * | 9/2005 | Demopoulos et al. ......... 726/23 |
| 2005/0273861 | A1 * | 12/2005 | Chess et al. ................... 726/25 |
| 2006/0036746 | A1 * | 2/2006 | Davis ......................... 709/228 |
| 2006/0277604 | A1 * | 12/2006 | Pandit et al. .................. 726/22 |
| 2007/0130620 | A1 * | 6/2007 | Pietraszek et al. ............. 726/22 |
| 2008/0184208 | A1 * | 7/2008 | Sreedhar et al. ............. 717/128 |

OTHER PUBLICATIONS

2005, James Newsome et al., "Dynamic Taint Analysis for Automatic Detection, Analysis, and Signature Generation of Exploits on Commodity Software," http://www.ece.cmu.edu/~dawnsong/papers/taintcheck.pdf.
Oct. 2004, Weidong Cui et al., "BINDER: An Extrusion-based Break-in Detector for Personal Computers," http://digitalassets.lib.berkeley.edu/techreports/ucb/text/CSD-04-1352.pdf.
Aug. 2005, Adam Turoff, "Defensive CGI Programming with Taint Mode and CGI::UNTAINT," http://www.usenix.org/publications/login/2005-08/pdfs/turoff.pdf.
2006, Author Unknown, "perlsec," http://perldoc.perl.org/perlsec.html.

(Continued)

*Primary Examiner*—Kambiz Zand
*Assistant Examiner*—Michael Guirguis
(74) *Attorney, Agent, or Firm*—Crawford Maunu PLLC

(57) ABSTRACT

Various approaches for detecting unauthorized actions on a computing platform are disclosed. In one approach, a memory region is designated as tainted if data is received from an untrusted source (such as the network) and written to that region. Thereafter, destination regions may be designated as tainted based on an operation having source and destination parameters in which at least a portion of an address range of the source overlaps an address range of a tainted memory region, and data from the source is used to update the destination. If an argument in an invocation of a function call references a tainted memory region, the call is determined to be unauthorized and data is output indicative of the unauthorized call.

21 Claims, 6 Drawing Sheets

OTHER PUBLICATIONS

2001, Dave Thomas, with Chad Fowler and Andy Hunt, "Locking Ruby in the Safe (from the book "Programming Ruby—The Pragmatic Programmer's Guide")," http://www.rubycentral.com/book/taint.html.

Aug. 2006, Engin Kirda et al., "Behavior-based Spyware Detection," http://www.seclab.tuwien.ac.at/papers/spyware.pdf.

2004, Jim Chow et al., "Understanding Data Lifetime via Whole System Simulation," http://www.stanford.edu/~talg/papers/USENIX04/taint-usenix04.pdf.

1996, Stephanie Forrest et al., "A Sense of Self for Unix Processes," http://www.cs.unm.edu/~forrest/publications/ieee-sp-96-unix.pdf.

* cited by examiner

DETECTION OF MALICIOUS PROGRAMS

FIELD OF THE INVENTION

The present invention generally relates to dynamically identifying execution of malicious programs based on data input to the system from an untrusted source and particular uses of that data on the system.

BACKGROUND

Botnets present a serious and increasing threat, with a significant percentage of spam transmitted through bot networks. Other threats include distributed denial of service attacks, packet sniffing, keylogging, file system or registry harvesting, malware distribution, phishing, online advertisement abuse, and manipulation of online polls and games.

A botnet is a network of compromised machines that can be remotely controlled by a botmaster over a command and control (C&C) network. Currently, Internet Relay Chat (IRC) is the most common C&C communication protocol. Individual bots connect to a preconfigured rendezvous point, which is commonly an IRC server and channel—access to which may require password authentication—and await commands from the botmaster. Malicious bots are mostly useful in the aggregate, and proportionally so.

The Honeynet Project identifies four main Win32 bot families: (1) the agobot, phatbot, forbot, Xtrembot family; (2) the sdbot, Rbot, UrBot, UrXbot family; (3) DSNXbot; and (4) mIRC-based bots. Bots from families (1), (2), and (3) are generally standalone executables at most relying on external programs for certain discrete functionality. The mIRC-based bots (e.g., GT Bot), on the other hand, rely heavily on auxiliary scripts executed on the mIRC IRC client.

There may be thousands of trivial variants of any malicious bot which differ in code details or the values of string variables (e.g., those which define the C&C rendezvous point). There may also be non-trivial variants of a bot B where the derivative inherits some or all of B's functionality and optionally extends B's set of supported commands. G-SySbot, for example, non-trivially extends the functionality of sdbot. Within a particular family there may also be non-trivial variation in implementation. For example, the agobot family includes bots that use the WASTE protocol for C&C as well as those that use IRC. Alternatively, a bot may adopt certain functionality from another, but otherwise have an independent implementation, as is the case with Spybot which only borrows sdbot's synflood implementation. Finally, a single bot executable may have numerous, substantially different variants, which are generated by applying various packing transformations (including compression and encryption) to the bot binary. These factors contribute to the difficulty of bot detection.

A number of approaches are available for detecting and reacting to botnets; these can broadly be characterized as network-based or host-based. Network-based approaches entail monitoring network traffic in order to identify botnet activity. These approaches may rely on botnets using a particular C&C protocol and/or port and/or set of rendezvous points. Content-based filtering is a network-based approach that may require that bot network traffic be transmitted in the clear (not encrypted or obfuscated in any way) and contain certain known byte sequences at certain offsets in the packet payload. Clearly this presents a challenge as network-based elements may not be able to ensure that such traffic is transmitted in the clear or that such communications occur using particular ports or hosts, etc. Host-based approaches monitor activity on the systems on which a bot may be executing; these approaches can be further sub-categorized as signature-based or behavior-based. Signature-based approaches may compare the contents of memory or files to byte sequences obtained from analysis of known malware instances. A drawback of this approach is that malware for which a signature does not yet exist may go undetected. Moreover, transformations or obfuscations (source or binary-level) may be applied to a malware instance M (for which a signature exists) resulting in a distinct malware instance M' that evades signature-based detection. Behavior-based approaches observe executing processes and apply heuristics to the observed behavior in order to determine whether such a process is likely to be malicious. For example, a behavior-based approach may monitor processes' incoming and outgoing network connections. Such approaches may generate too many false positives (e.g., by flagging behavior common across processes, benign and malicious alike) or too many false negatives (if, for example, the method only tracks network and not file system, registry, or process management behaviors) to be practically useful.

A method and system that address these and other related issues are therefore desirable.

SUMMARY

The various embodiments of the invention provide methods and systems for detecting unauthorized actions on a computing platform. In one embodiment, a method comprises designating as a tainted memory region, each memory region to which a received data set is stored in response to the received data set being received at the computing platform from an untrusted source. Each tainted memory region is addressable by the computing platform. A destination region is designated as a tainted memory region in response to an invocation of a first-type operation on the computing platform; the invocation including at least first and second arguments to the operation. The first argument references a source memory region and the second argument references the destination memory region, and at least a portion of an address range of the source region overlaps an address range of a tainted memory region, and the first-type operation uses data from the source region to update the destination region. The method determines whether an argument in an invocation of a function call references a tainted memory region, in response to the invocation of the function call on the computing platform. In response to determining that a function call argument references a tainted memory region, data is output indicating that the function call invocation is unauthorized.

In another embodiment, an apparatus is provided for detecting unauthorized actions on a computing platform. The apparatus comprises: means for designating tainted memory regions, wherein each tainted memory region has stored therein a received data set being received from an untrusted source; means for designating a destination region as a tainted memory region in response to an invocation of a first-type operation on the computing platform, the invocation including at least first and second arguments to the operation, wherein the first argument references a source memory region and the second argument references the destination memory region, and at least a portion of an address range of the source region overlaps an address range of a tainted memory region, and the first-type operation uses data from the source region to update the destination region; means, responsive to an invocation of a function call, for determining whether an argument in the invocation references a tainted memory region; and means for designating the invocation of the function call as unauthorized in response to determining that the argument references a tainted memory region.

Yet another embodiment provides a system for detecting unauthorized actions on a computing platform. The system comprises means for designating tainted memory regions responsive to data received from an untrusted source being written in the memory regions; means for detecting propagation of data from a tainted memory region to an untainted memory region and for designating the untainted memory region as tainted responsive to the propagation of data to it from a tainted memory region; and an argument checker. The argument checker interposes calls to selected program-callable functions. When a call is interposed, the argument checker determines whether an argument to the function references a tainted memory region. The argument checker outputs data indicative of the function call being unauthorized in response to determining that an argument references a tainted memory region.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which.

DETAILED DESCRIPTION

Figure 1:
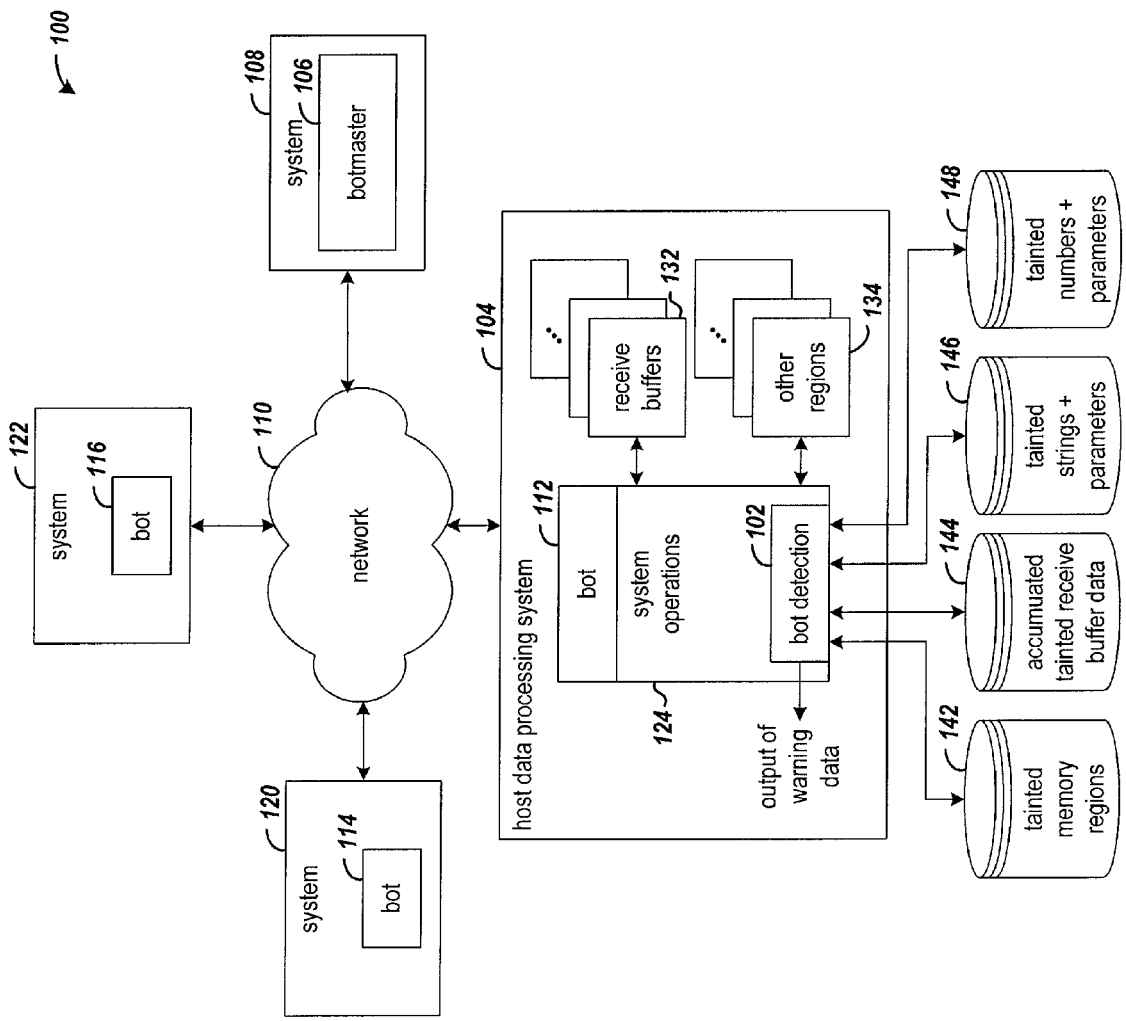
FIG. 1 is a block diagram of an example computing arrangement in which a bot may be detected in accordance with one or more embodiments of the invention.

The various embodiments of the invention consider data received from an untrusted source (such as the network) to be tainted and track tainted data as it is propagated to other memory regions in a system. The embodiments may be adapted to observe selected function calls, such as operating system calls and runtime library calls, made by a process without requiring source code or specially compiled binaries of the target application. The embodiments can be run on an arbitrary executable and do not require a modified software environment or particular language support. Bots are detected when suspect data ("tainted arguments") are supplied to select "gate functions", which are typically system calls (but may be other function calls) associated with malicious bot activity. While many bot actions, such as establishing network connections, creating files, and executing programs, may also be performed by benign applications, the methods described herein detect bots by distinguishing between actions that are initiated locally and actions initiated remotely by a botnet controller, who supplies parameters (such as network addresses or file names) for these actions or commands. Moreover, since the detection mechanism can be applied to track program behavior in real-time, detected instances of malevolent behavior ("unauthorized actions") can be prevented. In an alternative embodiment, the approaches described herein may be applied to off-line analysis of logged actions and data.

The various embodiments of the invention provide a host-based method that detects execution of a range of parameterized bot commands. The described approaches take advantage of the way that bots are controlled remotely over a C&C network. Since most known bot activity associated with commerce occurs on programmable distributed bot platforms, the detection method works well because it identifies precisely the functionality that makes bots most useful to their installers.

The actions taken by a monitored process that are visible to an embodiment are referred to as the interposition interface. For example, the interposition interface may consist of all operating system and runtime library calls made by a process. Alternatively, the interposition interface may consist of all assembly code instructions executed by a process. Those skilled in the art will recognize that certain interposition techniques provide system-wide interposition; that is, simultaneous interposition upon all processes executing on the system. There are a variety of interposition techniques, the selection of which will determine which actions taken by a monitored process are visible to the embodiment. Actions taken by a monitored process that occur outside of the interposition interface are referred to as out-of-band.

A bot's reliance on ongoing C&C is exploited to provide fine-grained bot detection. Data sources are categorized as trusted (e.g., the mouse or keyboard) or untrusted (e.g., network I/O). Data received by a monitored process from an untrusted source is considered tainted. When a portion of a tainted buffer is copied by a monitored process to a destination buffer, the corresponding portion of the destination buffer is designated tainted. Finally, a small set of gate functions is defined (e.g., those that perform critical tasks such as process or file management, network interaction, etc.). Particular arguments to these gate functions are the sinks. An instance of external control occurs when data from an untrusted source reaches a sink; that is, when a monitored process invokes a gate function G and provides tainted data in an argument to G.

Instances of external control are identified by tracking tainted objects via instrumented functions that are callable by the monitored process, of which there are three types: taint instantiators, taint propagators, and taint checkers. Those skilled in the art will recognize that operations other than what are traditionally thought of as "functions" may also be instrumented; for example, one may instrument an assembly code instruction such that this instruction participates in taint propagation; alternatively, one may instrument a memory-copying function that is callable by a monitored process. Therefore, in this description "function" is used to refer to all levels of software and hardware operations which potentially may be involved in processing tainted data. The primary type of tainted object is a tainted memory region (which is also referred to as a tainted address). In addition, in order to provide resilience against out-of-band memory copy operations (those which occur outside of the interposition interface), two types of tainted values may be used: tainted strings and tainted numbers. A tainted string consists of the contents of a tainted memory region, and a tainted number is a numeric value that was received from an untrusted source (such as the network). Those skilled in the art will recognize that additional types of data can be handled similarly.

Taint instantiation occurs in response to receipt of data by a monitored process from an untrusted source, such as the network. Upon successful receipt of data from an untrusted source, an entry into a data set is created which describes the buffer into which the tainted data was received. This entry includes the base and bounding addresses of the buffer. The memory region is also added, with the necessary parameters, to the collection of tainted addresses. The buffer is thereby designated as tainted. Note that references throughout to adding a memory region to a collection are intended to be understood as adding a description of that memory region (including its base and bounding addresses) to a collection.

Any function that copies some portion of an input buffer to some portion of an output buffer should be instrumented to participate in taint propagation. The purpose of taint propagation is twofold: to detaint tainted memory regions that are overwritten with untainted data and to taint regions to which tainted data has been written. In "detainting" a memory region, the entry that describes that memory region is removed from the collection.

Taint checking entails deciding whether data reaching sinks is tainted. The suitable gate functions and particular sink arguments may be identified through inspection of bot command implementations. Table 1 below lists an example set of behaviors, the candidate gate functions for each behavior, and the sink arguments for each identified gate function. A behavior is a general description of an action, such as "connecting to a tainted IP." The gate functions for a behavior are vantage points in the system at which the embodiment may determine whether the behavior is exhibited. For example, by checking certain arguments to the gate functions (1) connect and (2) WSAConnect, the embodiment may determine whether the "connecting to a tainted IP" behavior is exhibited in particular invocations of these functions by monitored processes.

In strict propagation mode, a particular memory region is considered tainted only when that memory region descends from a tainted receive buffer. The definition of descent is a recursive one: a descendant of some buffer B is a buffer into which some portion of B was copied or is a buffer into which some portion of a descendant of B was copied. That is, a memory region M is considered tainted under this mode only when there is a sequence of copy operations executed by the monitored process $<C(R\_1, R\_2), C(R\_2, R\_3), \ldots, C(R\_N-1, M)>$ starting with a copy from a tainted receive buffer ($R\_1$) and culminating in a copy to this memory region (M). Of course there may be interleaving irrelevant copies. Note that it is not required that the entire contents of M be identical to those of the ancestor receive buffer ($R\_1$), only that some portion of M descends from a tainted receive buffer. The taint propagation technique used in strict semantics is referred to as address-based taint propagation since the determination of whether a particular memory region is tainted considers only the address range of that particular region rather than, for example, the contents of such a memory region.

Under cause-and-effect propagation, as with strict propagation, a particular memory region is considered tainted when that memory region descends from a tainted receive buffer. However, cause-and-effect propagation will also consider a memory region M to be tainted if the contents stored at M match those of a known tainted memory region. This latter technique is referred to as content-based taint propagation since, in applying it, a memory region may be considered tainted on the basis of the contents stored in that region. Various example approaches for determining a match are described in association with step 330 of FIG. 4B. Thus, cause-and-effect propagation entails tracking not only tainted

TABLE 1

| Behavior | API function (gate) | sink argument [argument #] |
| --- | --- | --- |
| tainted open file | NtOpenFile | Filename [2] |
| tainted create file | NtCreateFile | Filename [2] |
| tainted program execution | CreateProcess{A, W}; WinExec | prog name [0] and command line [1]; prog name [0] |
| tainted process termination | NtTerminateProcess | Process name and PID [0] |
| bind tainted IP | NtDeviceIoControlFile | IP [6] |
| bind tainted port | NtDeviceIoControlFile | port [6] |
| connect to tainted IP | connect; WSAConnect | IP [1]; IP [1] |
| connect to tainted port | connect; WSAConnect | port[1]; port [1] |
| tainted send | NtDeviceIoControlFile; SSL_write | send buffer [6]; send buffer [1] |
| derived send | NtDeviceIoControlFile; SSL_write | send buffer [6]; send buffer [1] |
| sendto tainted IP | sendto; WSASendTo | IP [4]; IP [5] |
| sendto tainted port | sendto; WSASendTo | port [4]; port [5] |
| tainted set registry key | NtSetValueKey | Value name [1] |
| tainted delete registry key | NtDeleteValueKey | Value name [1] |
| tainted create service | CreateService{A, W} | Service name [1]; Binary path name [7] |
| tainted open service | OpenService{A, W} | Service name [1] |
| tainted HttpSendRequest | HttpSendRequest{A, W} | host, path, and referrer [0, 1] |
| tainted IcmpSendEcho | IcmpSendEcho | IP [1] |

Three user-selectable modes are provided for controlling taint propagation. These modes are: "strict," "cause-and-effect," and "correlative." These modes differ in the criteria applied to determine whether a region is considered tainted. In order to elucidate the operation of these modes, the following notation is used to describe a copy from one memory region, $M\_i$, to another memory region, $M\_j$: $C(M\_i, M\_j)$.

memory regions but also the values stored in such regions and using both in the determination of whether a memory region should be considered tainted.

Every memory region that would be considered tainted under strict or cause-and-effect propagation will also be considered tainted in correlative mode. Additionally, in correlative propagation mode, a particular memory region is considered tainted if that region consists of data that matches a substring of some data received from an untrusted source; this is referred to as substring-based tainting. If the interposition interface included all memory copying operations, then there would be no need for cause-and-effect and correlative propagation since taint propagation would have effectively designated all tainted memory regions. However, in the presence of out-of-band memory copies (that is, copies from one region to another that occur outside of the interposition interface), both cause-and-effect and correlative propagation mode provide varying degrees of robustness in the face of this decreased visibility.

FIG. 1 is a block diagram of an example computing arrangement 100 in which a bot may be detected in accordance with one or more embodiments of the invention. A bot detection component 102 is deployed on host system 104 for detecting and reacting to botnet activities such as those controlled by the bot master 106, which is hosted by another system 108 that is also coupled to the network 110. The example botnet includes bots 112, 114, and 116, which are controlled by the botmaster 106. Bots 114 and 116 are hosted by systems 120 and 122, which are also coupled to the network 110. Each of the systems 104, 108, 120, and 122 may be any class or architecture of data processing system, including stationary and wireless mobile devices.

The example bot 112 characteristically makes use of various system operations 124 in attempting to engage in unauthorized activity on the host system 104. These system operations are functions, including, but not limited to, operating system calls, runtime library functions, and underlying machine instructions of the host system. The bot detection component tracks tainted data from being received as input to the system 104, to being propagated to other memory regions in the system, to a use of the tainted data that may cause some undesired effect. Those skilled in the art will recognize that the bot detection component need not be implemented as a monolithic component as may be interpreted from the depiction as block 102. Rather the functions provided by the bot detection component may be implemented by way of instrumenting various system operations.

Receive buffers 132 are memory regions to which data received from a trusted or untrusted source is written. An untrusted source may be a component outside the input/output (I/O) boundary of the system. The source outside the I/O boundary may include the network 110, or a local or remote persistent storage device, or a user-input device such as a keyboard. The bot detection component is implemented to distinguish between different sources of input data and to consider some sources untrusted and others trusted. Receive buffers that have been written to with data from an untrusted source are referred to as tainted receive buffers. Upon designating a receive buffer as tainted, certain information describing that receive buffer is added to data set 144, the accumulated tainted receive buffer data. For example, user input data (such as that received via the keyboard or mouse) would not be designated as tainted, while data received via the network would be designated as tainted. Data read from a file in persistent storage may also be designated as tainted. An implementation may designate file data read from network attached storage as tainted (untrusted), while leaving file data read from local persistent storage untainted (trusted), depending on implementation requirements. It will be appreciated that a receive buffer having file data read from local persistent storage may also be designated as tainted if a risk is perceived.

In one embodiment, a fine-grained approach may be implemented in taint instantiation of data read from persistent storage. This may entail recognizing that certain files contain tainted data at certain offsets. When data is read from such a tainted location in the file, that data is considered tainted. Data read from other files or from other locations within the certain files would not be considered to be tainted.

Data in the receive buffers 132 may be propagated to other memory regions 134, and, if the source receive buffer S is designated tainted, then memory regions to which data from S propagates are also designated as tainted. In support of tracking the propagation of tainted data, the bot detection component saves data that describes tainted memory regions and parameters 142, an accumulated set of receive buffer data 144, tainted strings and parameters 146, and tainted numbers and parameters 148. This data and use thereof are described further in the text that follows.

In an example implementation, the bot detection component uses the Detours software library to intercept API-function calls by a target program. Those skilled in the art will recognize alternative mechanisms having comparable capabilities for different platforms. The example implementation has identified a set of functions to interpose upon, and a replacement function is provided for each function in that set. The replacement functions contain the relevant instrumentation for taint instantiation, propagation, and checking as described in more detail in association with FIGS. 2-5. The platform is packaged as a dynamically linked library (DLL), D, that can be injected into a target process. Only the process(es) into which D has been injected will be interposed upon. Upon injection, for each API function f upon which interposition is sought, D locates f in memory and then overwrites the first five bytes of f with an unconditional jump to the replacement function, f'. Thereafter, if an interposed-upon process calls f, control will instead be transferred to f'. Generally f' may perform some pre-processing, call the original, un-detoured function f, perform some post-processing at return from f, and then return. Since the Detours software involves overwriting the actual code that implements the target function, whether the address to that function is obtained at load time or run-time is immaterial; moreover indirect calls to that target function will also be visible. For example, if intercepted API function f calls API function g, the call to g from f will be visible to the interposition interface if g has also been intercepted. Interception of function calls is used for the initial identification of tainted objects, the tracking of the propagation of tainted objects, and the checking for use of tainted objects.

In general the lifecycle of data received as system input may include: copying some portion of that data to a destination buffer, tokenizing some portion of that data, and/or converting some portion of that data to a number.

The initial designation of a memory region as tainted occurs upon data input to the system from an untrusted source and stored in that memory region. That initial memory region is also referred to as a "tainted receive buffer." In addition to its base and bounds addresses, each tainted receive buffer (in data set 144) is parameterized by the socket descriptor on which its data was heard (e.g., for data received via the network) as well as by the contents of the receive buffer. The retention of the socket descriptor enables detection of the tainted send behavior, and the accumulated tainted buffer contents are used for false-positive and false-negative mitigation. A false-positive identification is a mistaken designation of a memory region as tainted, when the memory region has in fact been cleansed such as being written with untainted data by an out-of-band operation. A false-negative identification is a mistaken designation of a memory region as not tainted, when that memory region has been written with tainted data generally via an out-of-band operation. It will be appreciated that the false-positive mitigation described herein is optional.

The data that describes a tainted memory region is stored as data set 142, and the contents and parameters of tainted receive buffers, which are used for false-positive mitigation and for taint propagation under correlative propagation, are stored as data set 144. False-positive mitigation is applied to regions that are designated tainted prior to taking any action on the basis of such a region's alleged taintedness. Since there may be out-of-band copies to regions, a region R that was correctly designated tainted at one point in time may have subsequently been written to via an out-of-band operation with untainted data. In such a case, false-positive mitigation will ensure that copies from R do not result in the destination regions being designated tainted; it will also ensure that invocations of gate functions which pass R as an argument are not designated unauthorized. False-positive mitigation entails the confirmation by taint propagation and taint checking functions of a source region's taintedness by comparing the relevant portion of that region with that of its alleged ancestor receive buffer (that is, the receive buffer from which this buffer allegedly descended, where the definition of descent is as above).

Those skilled in the art will recognize that, as there are various character encoding schemes, it may be necessary to canonicalize an arbitrary data buffer (e.g., convert its contents to a particular encoding scheme E) prior to comparing the relevant portion of that buffer's contents to that of the alleged ancestor receive buffer, encoded using E. Such a data buffer would not need to be altered; rather, the conversion could be applied to a temporary copy of that data buffer that would then be used (in lieu of the original buffer) in the content comparison. Similar canonicalization may be a necessary preprocessing step in preparation for comparing the contents of an input data buffer to a tainted string. Additionally, note that the description throughout uses the terms "character buffer" and "data buffer" interchangeably. References to "character buffers" are not meant to exclude buffers whose contents are unknown (e.g., such as for functions which take void* buffers as arguments) or whose contents contain non-ASCII or non-UNICODE characters (e.g., such as for functions which take as input a buffer whose contents are encrypted and thus may consist of arbitrary byte values).

Since out-of-band memory copy operations may propagate tainted data in a manner invisible to the bot detection component ("false-negative"), two types of tainted values are used under cause-and-effect and correlative propagation to overcome this visibility limitation: tainted strings and tainted numbers. When a taint propagation function determines that a memory region is tainted (in particular, after that region's taintedness is confirmed via false positive mitigation checks), that region's contents are added (with the appropriate parameters) to the collection of tainted strings (stored data set 146). Thus, the traced program implicitly identifies tainted data tokens.

A tainted number is a numeric value that was received from an untrusted source (such as the network). For example, when a monitored program calls a conversion function (e.g., inet_addr, gethostbyname, atoi) on a tainted memory region, the resulting numeric value would be considered a tainted number.

Taint instantiation occurs upon invocation of each network receive function. Each network receive function is instrumented as well as SSL_read, which calls into a network receive function (WSARecv), decrypts the received data, and writes the resulting plaintext to the provided buffer. Functions that receive data on other input channels may be similarly instrumented.

There are generally four types of functions that may propagate tainted data, and calls to these functions are intercepted in the example embodiment. These "taint propagation functions" include those that: (1) take a data buffer and write to a different data buffer where the contents of the output buffer are a non-trivial sub- or superstring of those of the input buffer; (2) take a data buffer and output a numeric value; (3) take a data buffer input; and (4) read one numeric value, N, and convert N to an output numeric value that is different from N. The third type functions perform opportunistic taint propagation and are instrumented in order to ensure that any buffer that is encountered by the bot detection component whose contents match a known tainted string is a designated tainted memory region, and any buffer that overlaps with a tainted memory region is—with the appropriate parameters—a designated tainted string.

Deciding whether an input argument is tainted occurs analogously across these taint propagation function types. If the input argument is a numeric value, under strict semantics that value will not be considered tainted. Under cause-and-effect or correlative semantics, the bot detection component will determine whether that numeric value is in the set of tainted numbers. If so, that input argument is considered tainted. If not, under correlative propagation, an additional check is made: the numeric value N is converted to a string S and the bot detection component will consider N tainted if S is a substring of some data received from an untrusted source (such as the network). If the input argument is a data buffer, the bot detection component checks whether that input buffer's memory range overlaps with a previously identified tainted memory region, and, if so, whether it also passes the false-positive-mitigation checks. If so, the input data buffer is considered tainted. If not, under cause-and-effect and correlative propagation, the bot detection component determines whether the contents of the input data buffer match a known tainted string (data set 146). If so, the input data buffer is considered tainted. If not, under correlative propagation, the bot detection component will determine whether the contents of an input data buffer match a substring of the input data set (accumulated tainted receive buffer data—data set 144) and, if so, this input buffer will be considered tainted. If the input data buffer is not considered tainted, and if there is a destination region, that destination region will be marked untainted.

Upon determining that an input data buffer is considered tainted, the action taken depends upon the taint propagation mode. Under strict semantics, the output buffer is marked tainted using the appropriate parameters (updating data set 142). Under cause-and-effect or correlative propagation, the bot detection component ensures that the source memory region is included with the appropriate parameters in data set 142 (tainted memory regions) and data set 146 (tainted strings). If there is a destination memory region, then under both of these modes, the output buffer is marked tainted with the appropriate parameters (data sets 142) and the contents of this region are added with the appropriate parameters to the collection of tainted strings (data set 146). If the input is a tainted numeric value, then under cause-and-effect and correlative propagation, if there is a destination numeric value, the bot detection component adds that value to data set 148.

On an example platform, a number of functions are instrumented to serve as the gates for taint checking. To the greatest extent possible, the lowest function call in the chain is instrumented as a gate so as to derive the greatest benefit for the least instrumentation cost. An additional benefit of this approach is the ability to detect multiple commands through a single gate and to detect novel commands. In some cases, a particular gate function argument may be used differently by the system depending upon the functionality requested by the caller. For example, NtDeviceloControlFile is called by API functions that perform local port binding as well as by API functions that send data over the network; an argument A to NtDeviceloControlFile indicates the requested service (e.g., port binding or network data transmission). Then, NtDeviceloControlFile takes a data buffer argument B whose contents will be interpreted differently depending upon the value of A. In some cases, some portion of B's contents will be treated as a pointer to a pointer to a character buffer; in other cases, some portion of B's contents will be considered a pointer to a numeric port value.

A behavior is a general description of an activity. For example, "tainted process creation" is one behavior detected by the example implementation. There may be multiple function calls and arguments that could result in generation of a single behavior as demonstrated in Table 1. In particular, if WinExec is called and the callee supplies a tainted $0^{th}$ argument, then the "tainted process creation" behavior is exhibited. Likewise, calls to CreateProcessA or CreateProcessW for which the $0^{th}$ or $1^{st}$ arguments are tainted also exhibit the "tainted process creation" behavior. Conversely, a particular function call may be used to detect a variety of different behaviors. That is, the same function (e.g., NtDeviceloControlFile) may be instrumented to detect multiple different behaviors via checking different of its arguments or via checking different portions of its arguments or via considering different portions of its arguments to be different types.

The bot detection component also detects bot behaviors referred to as tainted send and derived send. Tainted send occurs when data received over one connection (or socket) is sent out on a different connection (or socket). Most commonly this is exhibited when the bot is serving as a proxy or the bot's implementation of a command entails network-message generation and transmission. As an example of the latter, the bot may receive a command over some socket s (which is the bot's connection to the rendezvous point) that specifies a webpage to download via providing a URL. The bot will then connect to the host encoded in that URL over a different socket, s', and send the HTTP GET request for the file path specified in that URL over s'. Thus, data received over s (e.g., the file path to request) is sent over a different socket s' (the one connected to the host specified in the URL). Derived send occurs when, from some API function f on some tainted input X, some value Y is obtained (where X !=Y) and then Y is subsequently sent on the network. A wide variety of data-leaking commands would match derived send, e.g., those where the bot controller specifies a particular registry key and asks for its value on the victim host, as does DNS hostname resolution.

Figure 2:
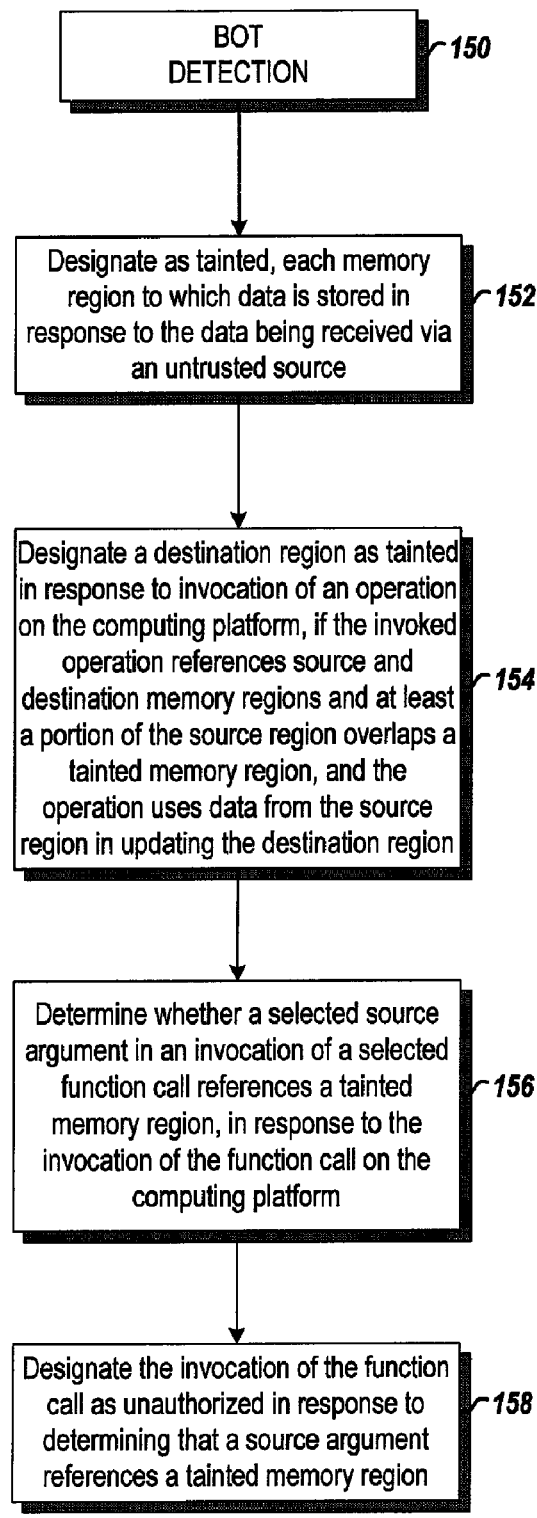
FIG. 2 is a flowchart of an example process for detecting a bot in accordance with one or more embodiments of the invention.

FIG. 2 is a flowchart of an example process 150 for detecting a bot in accordance with one or more embodiments of the invention. A data object is first designated as tainted in a phase that may be referred to as taint instantiation. At step 152, a memory region to which data is stored is designated as tainted in response to the data being received via an untrusted source. As previously described, address parameters that describe the memory region along with the contents of the memory region are saved by the embodiment for use in taint propagation and taint checking. The contents of a buffer may flow or propagate to other memory regions as the monitored process uses this received data.

When data in a tainted memory region is used in updating another memory region, the destination, the destination memory region is also designated as tainted in a phase that may be referred to as taint propagation. In step 154, specifically, a destination region is designated as tainted in response to invocation of an operation on the computing platform, if the invoked operation references source and destination memory regions, at least a portion of the source region overlaps a tainted memory region, and the operation uses data from the source region in updating the destination region.

Taint checking is a phase in the bot detection approach in which certain function calls are checked for use of tainted data. At step 156, the process determines in response to the invocation of a function call (a gate) whether any of the selected arguments in this invocation reference a tainted memory region or is a tainted numeric value. In the example embodiment, calls to certain functions—including system calls such as those which perform file management, process management, registry viewing, registry editing, and network interaction—are checked for use of tainted data in selected arguments as described above.

If one of these functions uses tainted data in one of its selected arguments, at step 158 the invocation of the function call is designated as unauthorized. This information may be communicated to an application user or a system administrator as the implementation may require. FIGS. 3, 4A, 4B, and 5 illustrate further details of the taint instantiation, taint propagation, and taint checking phases.

Figure 3:
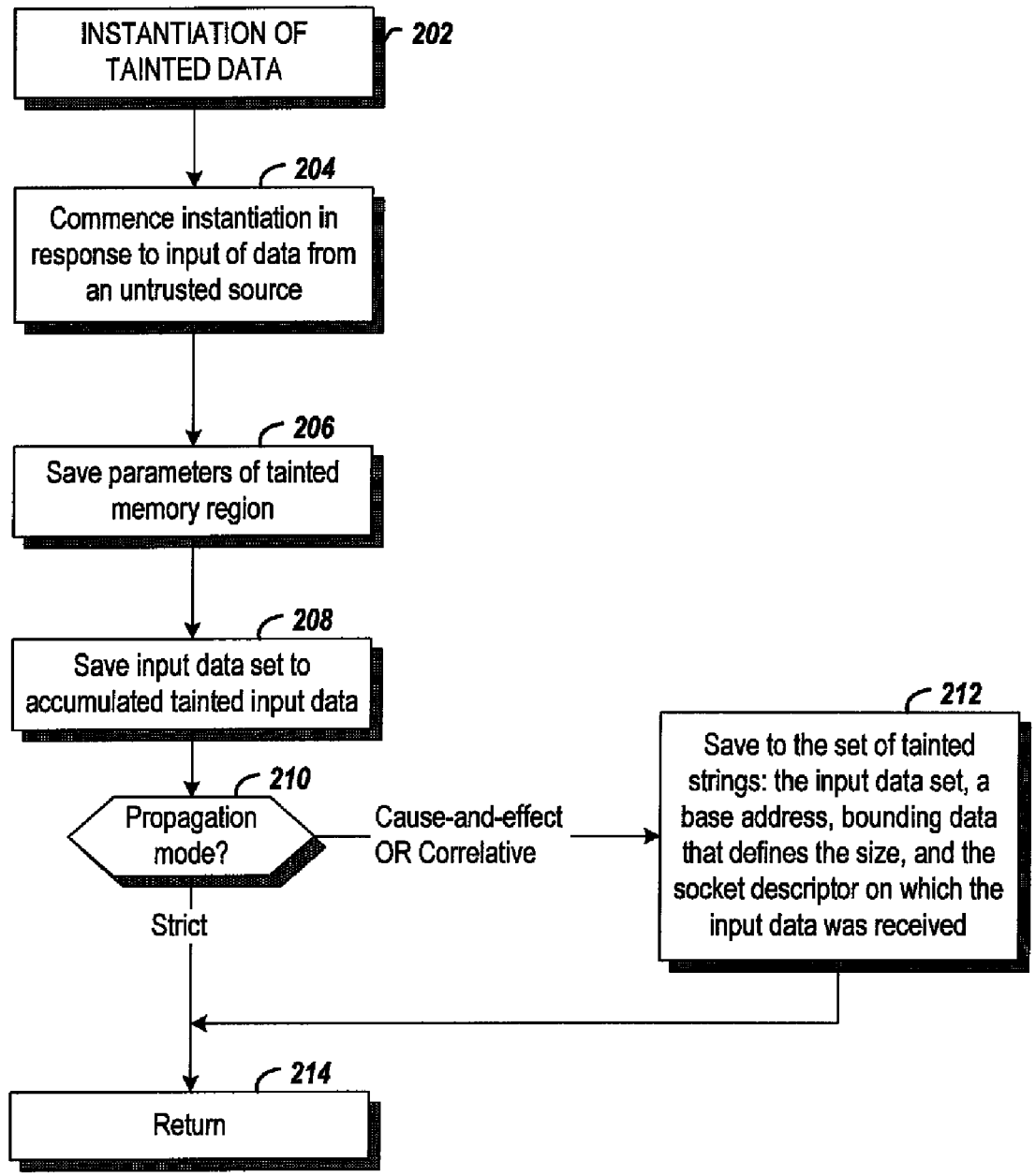
FIG. 3 is a flowchart of an example process for instantiating tainted data in accordance with one or more embodiments of the invention.

FIG. 3 is a flowchart of an example process for instantiating tainted data 202 in accordance with one or more embodiments of the invention. As described above, certain functions are intercepted when data is input from an untrusted source. These functions include, but are not limited to, all network receive functions and functions that input data from external storage. In response to input of data from an untrusted source, the instantiation of tainted data is initiated at step 204. The untrusted sources may include the network or an external storage device.

The data input from an untrusted source is generally stored in a receive buffer, which is designated as a tainted memory region. The designation of the memory region as tainted involves saving parameters that characterize the region, such as its base memory address, length, as well as by the socket descriptor on which the data was heard (e.g., for data received via the network) as shown by step 206. The socket descriptor is saved in order to detect one particular bot behavior: the tainted send behavior, which identifies when data heard on socket X is sent out on a different socket Y.

The data received in the receive buffer is also saved for subsequent use in bot detection as shown by step 208. The contents of a receive buffer are saved for purposes of false-positive and false-negative mitigation. For example, there may be a memory region M that has been designated as tainted. Then, subsequently, M is written to with untainted data by operations outside the interposition interface. In such a case, M should no longer be considered tainted, even though it may still be designated as such. In order to detect the out-of-band detainting of M, the receive buffer's data contents must be saved for comparison during false positive mitigation. During false positive mitigation, when the relevant portion of M's contents are compared to those of M's alleged ancestor receive buffer, the comparison will indicate that the contents do not match and thus that M should no longer be considered tainted.

The accumulated receive buffer contents may also be used to mitigate false negatives. Recall that a memory region may be written to with tainted data via an out-of-band operation, where out-of-band operations by definition do not participate in taint propagation. The bot detection system's mistaken belief that such a region is untainted is an example of a false negative. To mitigate against this occurrence, the bot detection system (1) under cause-and-effect and correlative modes, compares the contents of the source memory region to known tainted strings and (2) in correlative propagation mode (as described further in FIG. 4B), searches the accumulated contents of the receive buffers for the data stored in the source memory region. Note that these additional checks only occur for a memory region that does not overlap with any existing tainted memory regions (data set 142).

The taint propagation mode further determines what information is saved during taint instantiation. As previously discussed, there are three user-selectable modes provided for controlling taint propagation. In strict propagation mode, a particular memory region is considered tainted only when that memory region descends from a tainted receive buffer (address-based tainting). In cause-and-effect and correlative propagation, a memory region may also be considered tainted if its contents match a known tainted string (content-based tainting). In correlative propagation mode, a particular memory region may also be considered tainted if that region consists of data that matches a substring of some data received from an untrusted source (substring-based tainting). In the absence of user selection of propagation mode, the default propagation mode is strict. Those skilled in the art will recognize that, although the cause-and-effect and correlative modes of propagating and checking for use of tainted data are described as building on and in combination with the strict mode, each mode may be implemented individually according to implementation requirements. For example, one approach may implement and use only the processing associated with cause-and-effect mode without using processing associated with either of the strict or correlative modes. Similarly, the processing associated with the correlative mode may be implemented and used without the described processing for the strict and correlative modes. Also, the processing for cause-and-effect and correlative modes may be implemented in combination without use of the processing for strict mode.

If the propagation mode is the default strict propagation, no further information is saved and control is returned to the intercepted function. If the propagation mode is either of cause-and-effect or correlative, the instantiation process at step 212 saves to the set of tainted strings (FIG. 1, 146): the contents of the receive buffer, a base address, bounding data that defines the size, a value that uniquely identifies the ancestor tainted receive buffer, and the socket descriptor on which the input data was received. In an alternative embodiment, the contents of the receive buffer are used to generate a hash key, and the base address, bounding data and socket descriptor are stored in association with the hash key. Those skilled in the art will recognize suitable hash functions and data structures for accommodating the descriptive data for the accumulated character strings.

Figure 4A:
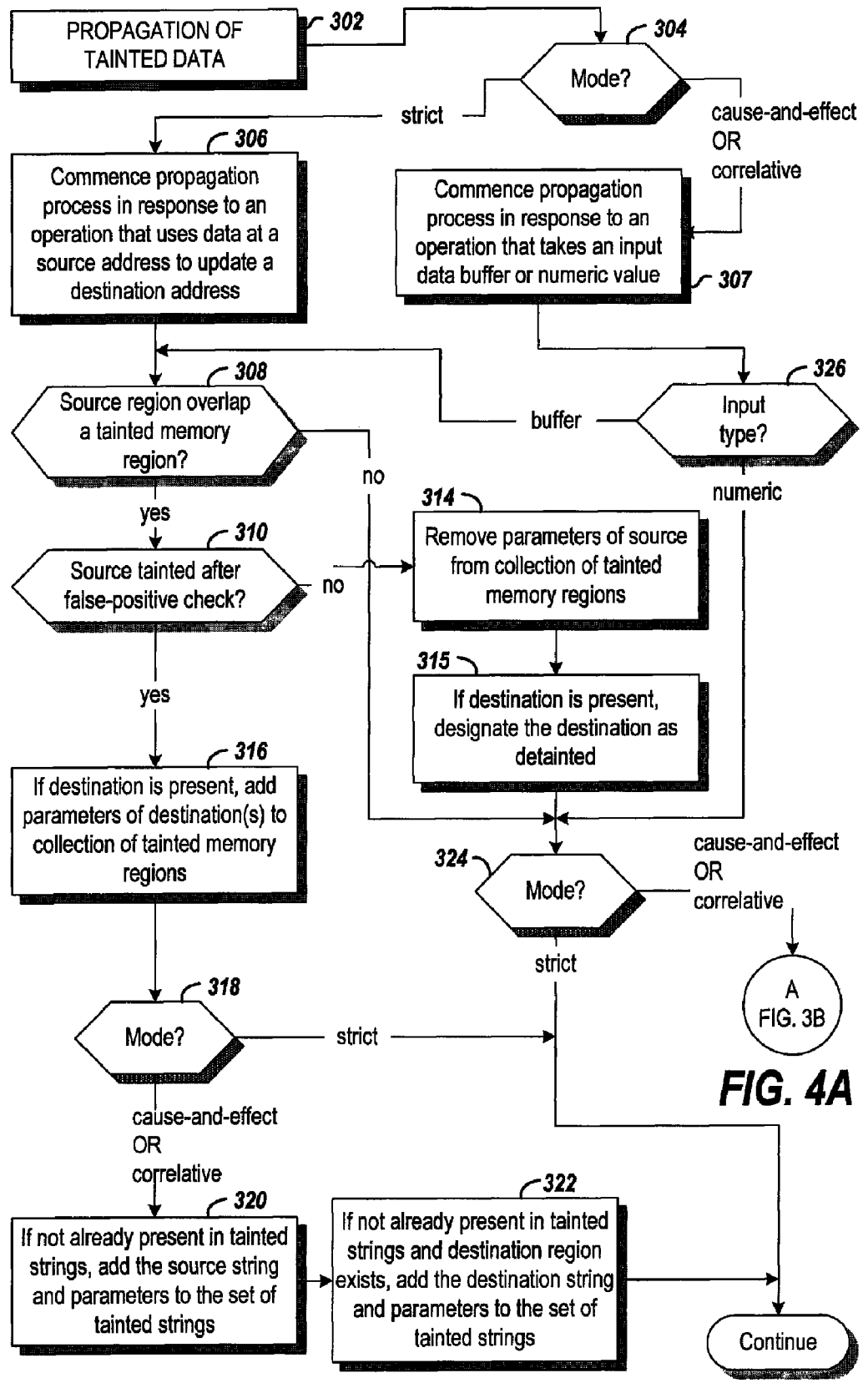
FIGS. 4A and 4B form a flowchart of an example process for propagating tainted data in accordance with one or more embodiments of the invention.
Figure 4B:
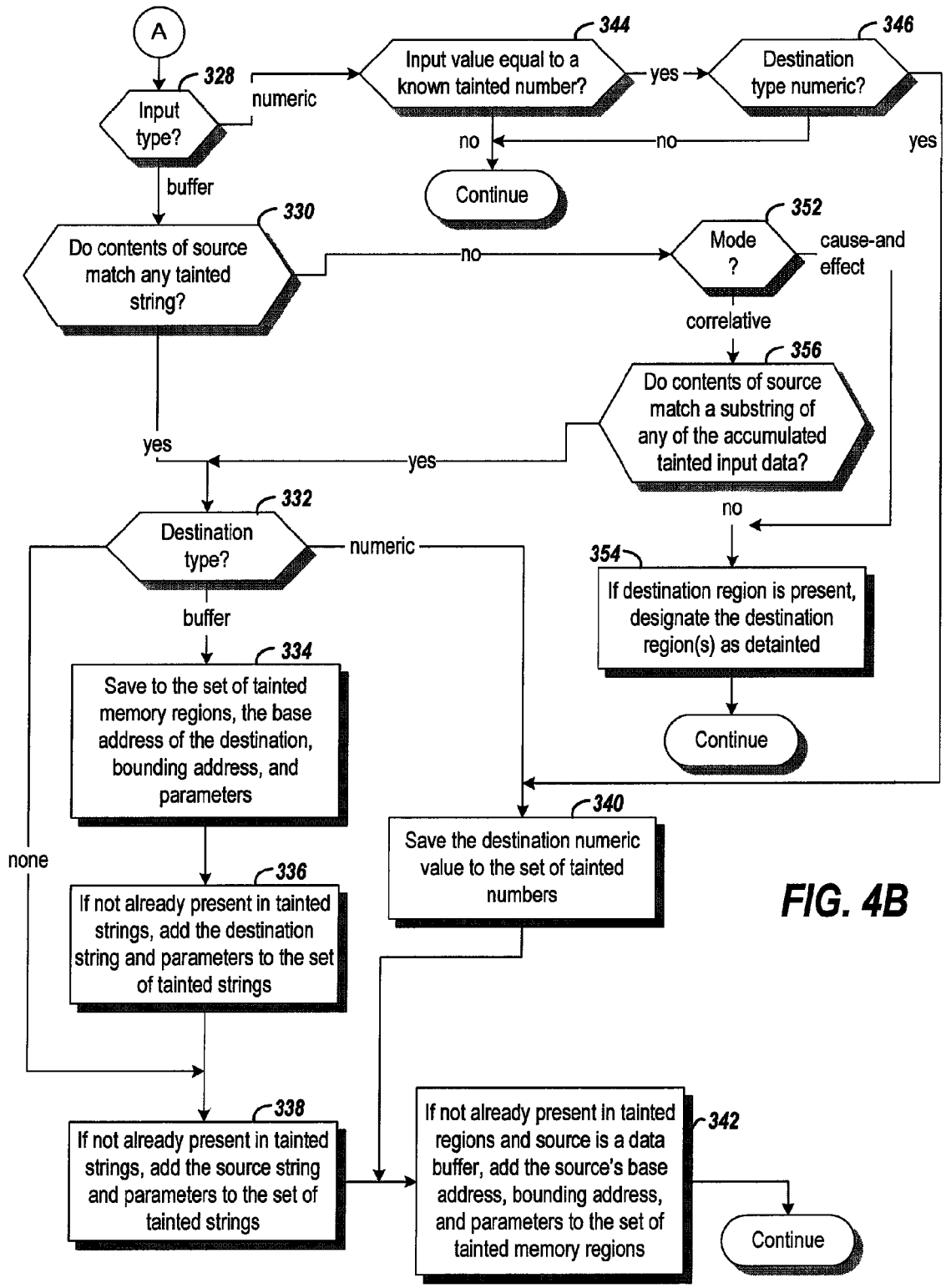

FIGS. 4A and 4B form a flowchart of an example process 302 for propagating tainted data in accordance with one or more embodiments of the invention. Taint propagation commences depending on the mode (decision step 304). If the mode is strict, then taint propagation commences in response to an operation that uses data at a source address to update (including replace) data at a destination address (step 306). If the mode is either cause-and-effect or correlative, taint propagation commences in response to an operation that takes an input data buffer or numeric value (step 307).

As previously described, under cause-and-effect or correlative propagation, there are generally four types of functions that may propagate tainted data, and calls to these functions are intercepted in the example embodiment. These "taint propagation functions" include those that: (1) take a data buffer and output a different data buffer where the output is a non-trivial sub- or superstring of the input; (2) take a data buffer and output a numeric value; (3) take a data buffer input; and (4) read one numeric value, N, and converts N to an output numeric value that is different from the input. Examples include: for the first type, copy functions such as memcpy or strncpy; for the second type, functions such as atoi; for the third type, functions such as ShellExecute; and for the fourth type, functions such as htons, which converts a numeric value from one endian format to another endian format.

Alternatively or in addition to the selected functions that are intercepted, execution of certain machine instructions may be trapped for purposes of propagating taint designations. The instructions include, for example, those that move data from one location to another, perform arithmetic operations on data, and others comparable to the functions described above.

If in strict mode and the source memory region in the operation overlaps (in part or wholly) a tainted memory region, as determined from the data set 142 (FIG. 1) that describes tainted memory regions (decision step 308), the process also checks whether the source region is actually tainted in view of a false-positive mitigation check on the source (decision step 310). The false positive mitigation check compares the contents of the relevant portion of the source memory region to the contents of the relevant portion of the identified ancestor receive buffer (FIG. 1). Certain parameters retained for each tainted memory region enable this false-positive-mitigation check. In particular, associated with a tainted memory region T is a unique identifier of its alleged ancestor receive buffer, the offset into that tainted receive buffer from which this region descends, and the offset into T at which the tainted data begins. By way of example, consider a tainted receive buffer whose contents are the letters of the English alphabet in order and capitalized; thus, this buffer contains "ABCDE . . . XYZ." A particular tainted region that descends from this tainted receive buffer may contain the following: "Msg: JKLMNO EndMsg." That tainted region then would be parameterized in part by: (1) a unique identifier of the receive buffer from which this region descends; (2) the offset into that ancestor receive buffer from which this region's tainted data descends; and (3) the offset into this tainted region at which the tainted data begins. The value for parameter (1) would be a unique identifier of the receive buffer containing "ABCDE . . . XYZ." The value for parameter (2) would be the number nine since the tainted data in this region ("JKLMNO") starts at an offset of nine from the beginning of the ancestor receive buffer (that is, after "ABCDEFGHI"). Finally, the value for parameter (3) would be the number five since the tainted data in this tainted region begins at an offset of five from the start of this region (that is, after "Msg:"). An additional parameter might identify the number of bytes of tainted data which in this case would be six since the tainted data consists of six bytes ("JKLMNO"). The relevant portion of the tainted region then is the actual tainted data which is "JKLMNO". If the relevant portion of the contents of the source are not identical to the relevant portion of the ancestor receive buffer's contents (as a result, e.g., of an out-of-band copy to the source memory region from an untainted region), then the source is no longer considered tainted, and the parameters of the source are removed from the collection of tainted memory regions 142 as shown by step 314. If a destination region is present, the destination is also designated as detainted at step 315 (i.e., if the destination is present in the collection of tainted memory regions, the entry for the destination is removed), If the source memory region is found to still be tainted, the process proceeds to step 316. If there is a destination region, step 316 adds the parameters of the destination memory region to the collection of tainted memory regions 142. The process then proceeds to the mode check at decision step 318.

If the taint propagation mode is strict, decision step 318 returns from the function that was interposed. For cause-and-effect and correlative modes, the source string and its parameters are added to the set of tainted strings if the string is not already present in the set (step 320). Similarly, the destination string and its parameters are added to the set of tainted strings if a destination is present and the string is not already present in the set (step 322). The process then returns from the function that was interposed.

In the example embodiment, these checks (starting with step 304) are performed after the interposed-upon operation returns but prior to passing control back to the monitored process. Recall that the example embodiment allows interposition on intercepted functions at the entry point and the exit or return point of such functions. The processing described above occurs at the exit point of such functions and, upon completion of processing, returns control to the monitored process. Those skilled in the art will recognize that the taint propagation steps may occur at alternative points in the execution of an intercepted operation.

Those skilled in the art will recognize that the propagation process is not limited to tainting a single destination per source and may easily handle the tainting of multiple destination memory regions from a single source. For example, the Windows API function InternetCrackUrl takes a provided URL and decomposes it, outputting that URL's components, including its: hostname, file path, username, and password. Thus, this function outputs multiple destination buffers, each of which contains some portion of the input buffer, and each of which may be designated as tainted.

If the source does not overlap a tainted memory region (decision step 308), the process proceeds directly to the mode check at decision step 324. Likewise, if the parameters of the source are removed from the collection of tainted memory regions (step 314) after failing the false-positive check, the destination is designated as detainted, and the process proceeds to the mode check at decision step 324.

As indicated above, if the mode is either cause-and-effect or correlative, taint propagation commences in response to an operation that takes an input data buffer or numeric value (step 307). For both cause-and-effect and correlative modes, if the input type is a data buffer, decision step 326 directs the process to decision step 308, which is described above. If the source is a numeric type, decision step 326 directs the process to the mode check at decision step 324.

In the mode check at decision step 324, if the mode is the default mode, strict taint propagation, the process returns from the function that was interposed. Otherwise, if the propagation mode is either cause-and-effect or correlative, the process continues at decision step 328 of FIG. 4B.

If the type of the input parameter is a data buffer (decision step 328), the process also checks whether the contents of the source region match a known tainted string in the collection of tainted strings 146 (decision step 330). When determining whether the contents of a buffer match a known tainted string, there are several considerations: which portion of the buffer is being compared, which portion of the tainted string is being compared, and what type of comparison is being performed. In the base case, the entire contents of the buffer are compared to the entire contents of a tainted string in a case insensitive manner. In such a case, a buffer's contents will be said to match a tainted string if the length of the buffer is the same as that of the tainted string and, for every character c in the buffer, the corresponding character c' in the tainted string is identical where the case of alphabetic characters is ignored. In this case, correspondence between characters is defined by position; that is, the i'th character of the buffer is compared to the i'th character of the tainted string for values of i from 1 to n for a string consisting of n characters. Performing case comparison insensitively means that two alphabetic characters will be considered identical if they represent the same letter regardless of whether the letter is capitalized or not. In one embodiment, certain types of characters—e.g., "whitespace" characters (such as space, tab, newline, etc.) or punctuation characters—may be excluded from comparison in the buffer or in the tainted string or both. This exclusion may entail advancing the offset into the buffer containing such an ignored character with or without advancing the corresponding offset into the buffer with which comparison is being performed. Alternatively, comparison may be performed for a number of characters determined by the length of the buffer or by the length of the tainted string. In such a case, the buffer's length may be different than that of the tainted string, but as long as the characters being compared are identical, a match may be said to occur. Additionally, a substring of the buffer may be compared to a substring of a tainted string; that is, rather than commencing comparison with the first character of each of the buffer and the tainted string, comparison may commence from a character other than the first for the buffer, the tainted string, or both. Moreover, comparison may proceed for every subsequent character through some position rather than for all of the rest of the characters. Thus, for the source buffer and/or the tainted string, the starting and ending characters for comparison may be other than the first and last characters, respectively. For example, if a buffer or a tainted string is known to contain a file path, it may be desirable to only compare the file name portion of this buffer or tainted string. That is, the directory path (which precedes the file name) and/or the file-type extension are excluded from the comparison. For a buffer or tainted string that contains an IP address in dotted decimal notation (DDN), it may be desirable to compare only the first octet of that IP address, the first two octets, the first three octets, etc. Additionally, for a buffer or tainted string that contains a uniform resource locator (URL), it may be desirable to compare only the hostname portion of that URL.

Preprocessing may be applied to the buffer prior to comparison. This preprocessing includes but is not limited to converting the buffer to use a particular encoding format (e.g., from UNICODE to ANSI). Preprocessing may also include performing decryption; that is, if a buffer is known to be encrypted and the decryption key is available, the source buffer may be decrypted using that key and then comparison would be performed against the decrypted buffer. The preprocessing may be applied "in-place"—possibly altering the contents of the source buffer. Alternatively, the preprocessing may be applied to the source buffer in order to obtain a temporary buffer which consists of the contents of the source buffer after the preprocessing step has been applied. Then this temporary buffer would participate in comparison or matching rather than the original buffer even though references in the text and figures may be to performing matching on the source buffer. In an alternative embodiment, a hash value may be generated from the contents of the source region, and that hash value may be used to lookup the associated base address, bounding information and socket descriptor to determine a match. Those skilled in the art will recognize that, based on the particular application or system use of the data items being compared, one or more alternative approaches to those described above may be implemented to determine a match.

If there is a match, the process further checks the data type of the destination at decision step 332. For a data buffer destination, the address of the destination and other address bounding data and parameters are saved to the collection of tainted memory regions at step 334. If the destination buffer's contents are not already present in the set of tainted strings, the destination buffer as a string and its parameters are added to the set at step 336. If the source string is not already in the collection of tainted strings, the source string and parameters are added at step 338. For a numeric destination, the destination numeric value is saved to the collection of tainted numbers 148 (FIG. 1) at step 340. If the source memory region is not already in the collection of tainted addresses, the source memory region is added to tainted memory regions (data set 142) with the appropriate parameters at step 342 if the source is a data buffer. The process then returns from the function that was interposed.

If at decision step 330, the contents of the source do not match any tainted string, the process proceeds to decision step 352 to check the taint propagation mode. For cause-and-effect mode, the destination region is designated as untainted as shown in step 354, and the process then returns from the function that was interposed.

If the propagation mode is correlative, the process at decision step 356 checks whether the contents of the source region matches a substring of any data within the accumulated tainted receive buffers 144. Determining whether there is a match between the contents of the source region and a substring may be accomplished using the techniques described above for step 330. If not, the process continues at step 354 as described above. And if so, the process continues at decision step 332, also described above.

If the input data type is numeric, decision step 328 directs the process to decision step 344. If the input numeric value is equal to a known tainted number (decision step 344) and the destination type is also numeric (decision step 346), the process proceeds to step 340, which is described above. If the destination type is not numeric or the input value is not equal to a known tainted number, the process continues with the function that was interposed.

Figure 5:
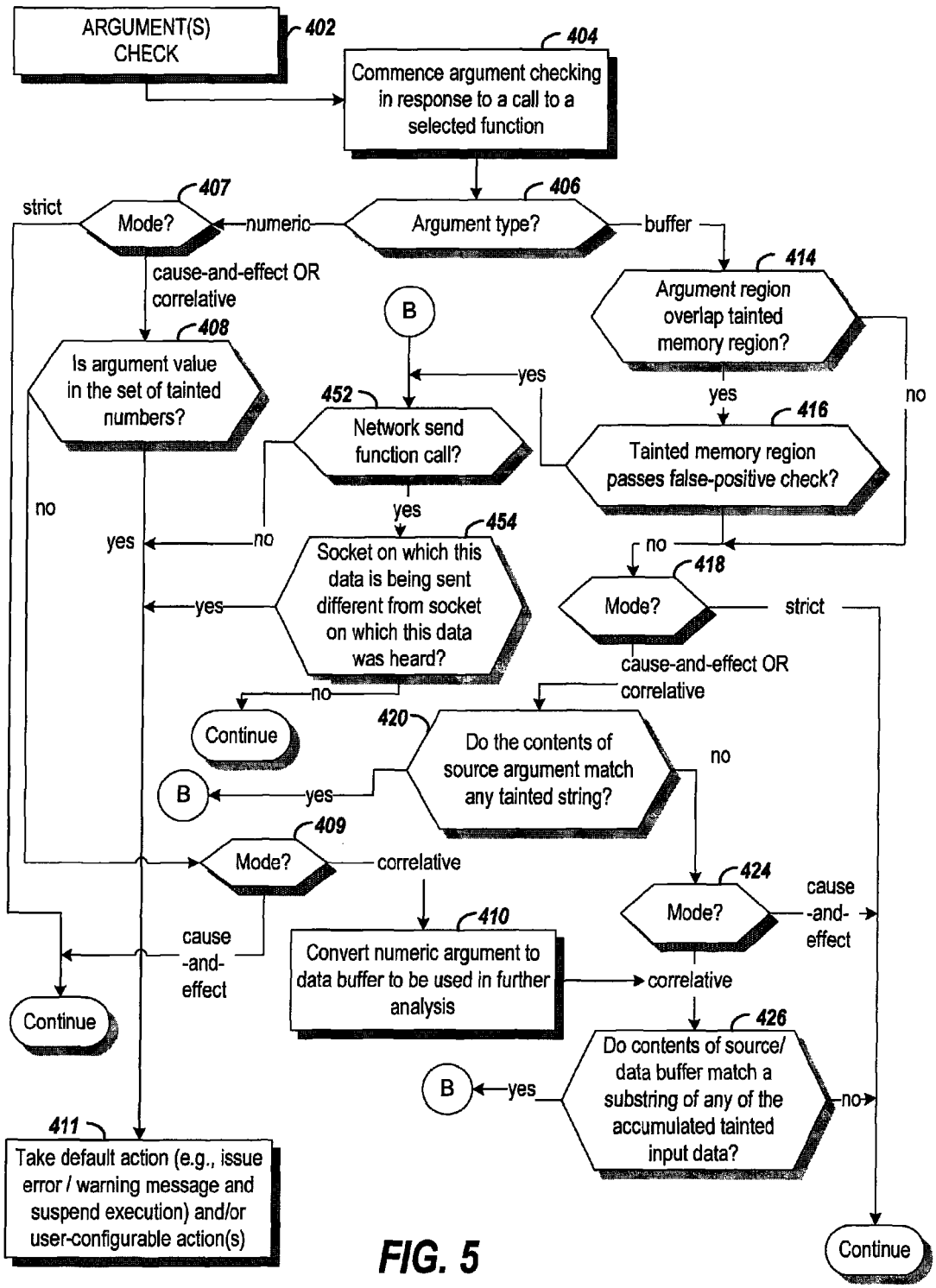
FIG. 5 is a flowchart of an example process for checking arguments in a call to a selected function in accordance with one or more embodiments of the invention.

FIG. 5 is a flowchart of an example process for checking arguments for selected function calls in accordance with one or more embodiments of the invention. As previously described, a number of functions may be instrumented for taint checking and, for each such function, some set of its arguments will be checked for taintedness. In some cases the same function may be instrumented to detect multiple behaviors. For example NtDeviceloControlFile is called by network send functions as well as by bind. Thus four separate behaviors (binding a tainted port, binding a tainted IP, tainted send, and derived send) are flagged via examination of this function's input parameters.

In other cases, multiple functions may be instrumented in order to check for a single behavior. For example, tainted program execution is detected through instrumentation of three functions: CreateProcess{A,W} and WinExec. Each is instrumented either because it does not call into any of the others (WinExec) or because instrumentation may be necessary to ensure that newly-spawned (child) processes are also monitored by the bot detection component. It will be recognized, however, that since successful calls to ShellExecute{Ex}{A,W} eventually call into CreateProcessW, there is no need to instrument as a gate each ShellExecute function.

Finally choosing as a gate the lowest-level function call enables detection of novel commands and of multiple commands through a single gate. For example commands that list a directory, delete a file, or replace a file generally result in a call to NtOpenFile since many of the Win32 API functions related to these tasks call into this native API function, including: MoveFile{Ex}{A,W}, MoveFileWithProgress{Ex}{A,W}, DeleteFile{A,W}, ReplaceFile{A,W}, Win32DeleteFile, etc.

Tainted send behavior is generally exhibited by two types of commands: redirects and those that generate network messages (SMTP, HTTP, FTP etc.). When the bot is acting as a proxy (i.e., as a port redirect), it will generally echo output on a second socket that which was received on a first socket. For network messages the data heard on the first socket specifies the parameters to send on the second (e.g., the MAIL FROM and RCPT TO email addresses, the file path to request, usernames/passwords, etc.).

A wide variety of data leaking commands may match derived send, for example those that specify a particular registry key and ask for its value to be returned, as would other commands that seek to obtain the values of specific parameters in use by the victim host. One command type commonly used across bots matches this behavior: DNS lookups, where the bot controller requests hostname resolution and passes the name to resolve. The bot then resolves the hostname and returns the IP in DDN (dotted decimal notation).

The argument check process 402 commences in response to a call to one of the taint checking functions at step 404. Those skilled in the art will recognize that the illustrated process may be applied to multiple arguments in a function call even though the text in the diagram is specified in the singular form. For numeric argument types (decision step 406), the process first checks the mode (decision step 407) and if the mode is either cause-and-effect or correlative the process determines whether the value of the argument is in the set of tainted numbers (decision step 408). If not and the mode is cause-and-effect (decision step 409), the process continues with the function that was interposed. Otherwise, for the correlative mode (decision step 409) the process converts the numeric argument to a character buffer (step 410), which is used as the source in further analysis at decision step 426. If at decision step 408, the argument value is in the set of tainted numbers, the process performs either a default action or user-configurable action to handle the detected bot activity at step 411. Such actions may include alerting the user, preventing that function call invocation from completing, killing the process that performed the unauthorized invocation, and deleting the executable of the process that performed this unauthorized invocation.

In addition to responding to specific unauthorized invocations, as part of step 411, a tally may be maintained of the number of unauthorized invocations made by a process and the behavior exhibited by each such invocation. A policy may be specified to describe the conditions with respect to unauthorized invocations made by a process under which that process should be labeled a bot by the bot detection component. For example, a policy may indicate that a process is considered a bot only after having performed X unauthorized invocations. Alternatively, the policy may require that at least Y different behaviors (of those listed, e.g., in Table 1) must be exhibited by the process before designating it a bot. The policy specification and requirements could be configurable as part of a user interface. Similarly, policies may be configured for certain known benign programs. For example, certain unauthorized invocation types for certain benign or trusted programs that are known to exhibit these behaviors may be ignored. This may be referred to as program behavior whitelisting.

Note as well that identification of certain commands could be provided, rather than (or in addition to) identifying each component behavior. For example, a command provided by many malicious bots is one that downloads and executes a program from the Internet. Execution of this command may result in exhibition of multiple behaviors, including: connecting to a tainted address, tainted send, tainted file creation, tainted file open, and tainted process execution. Step 411 then would entail retaining state that describes the unauthorized invocations exhibited by this process. Upon seeing such a sequence of unauthorized invocations made by a process, the user may be alerted that this particular command was exhibited, rather than or in addition to alerting the user of each component unauthorized invocation.

A process may also be identified, on the basis of the types of unauthorized invocations made by that process, as more likely to be a variant of a particular bot family. Again, the information necessary to make such an identification may be saved as part of step 411 and the identification itself may occur as part of step 411. Different bot implementations of commands enable this discrimination as a bot from a particular family may never exhibit certain behaviors whereas a bot from a different family may routinely exhibit those same behaviors (or may exhibit a particular behavior B via exclusively invoking a particular one of B's according gate functions).

For a buffer argument, the process determines whether the argument overlaps a tainted memory region as indicated by the address of the argument and the base addresses and bounds of the tainted memory regions (decision step 414). If so, and the tainted memory region passes the false-positive mitigation check (decision step 416), then the process proceeds to decision step 452 to check for a tainted send as described below.

If the argument does not overlap a tainted memory region (414) or the tainted memory region fails the false-positive check (416), then further argument checking is performed based on the propagation mode (decision step 418). For strict mode, the process continues with execution of the function that was interposed. For the cause-and-effect and correlative modes, the process determines whether the contents of the source argument match any of the tainted strings (decision step 420). If so, then the process proceeds to decision step 452 to check for a tainted send as described below.

If the contents of the source argument do not match any of the tainted strings (decision step 420) and the mode is cause-and-effect (decision step 424), then the process continues with the function that was interposed. Otherwise, in correlative mode the process determines whether the contents of the source match a substring of any of the accumulated tainted receive buffers (decision step 426). If so, the process checks for a tainted send at step 452. Otherwise, the process continues with the function that was interposed.

For detecting a tainted send, decision step 416 directs the process to decision step 452 if the tainted memory region passes the false-positive check. If the function call is a network send type call (that is, one of the gate functions associated with the tainted send behavior as in Table 1), decision step 452 directs the process to decision step 454. If the socket on which the data is to be sent is different from the socket on which this same data was heard, then a tainted send has been detected and decision step 454 directs the process to step 411 for the default action. Otherwise, the process continues with the function that was interposed.

Those skilled in the art will appreciate that various alternative computing arrangements, including one or more processors and a memory arrangement configured with program code, would be suitable for hosting the processes and data structures of the different embodiments of the present invention. The computing arrangement may be a standalone data processing system or multiple data processing systems that are coupled via a network. Generally, different architectures of computing arrangements may be used based on implementation requirements. In addition, the processes may be provided via a variety of computer-readable media or delivery channels such as magnetic or optical disks or tapes, electronic storage devices, or as application services over a network.

While the detailed description elucidates how the present invention can be applied to detecting the execution of a bot on a host, those skilled in the art will recognize that this method may be adapted to detect execution of other classes of malware such as backdoor programs.

The present invention is thought to be applicable to a variety of software systems. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

We claim:

1. A processor-implemented method for detecting unauthorized actions on a computing platform, comprising:

designating as a tainted memory region, each memory region to which a received data set is stored in response to the received data set being received at the computing platform from an untrusted source, wherein each tainted memory region is addressable by the computing platform;

designating a destination region as a tainted memory region in response to an invocation of a first-type operation on the computing platform, the invocation including at least first and second arguments to the operation, wherein the first argument references a source memory region and the second argument references the destination memory region, and at least a portion of an address range of the source region overlaps an address range of a tainted memory region, and the first-type operation uses data from the source region to update the destination region;

determining whether an argument in an invocation of a selected function call references a tainted memory region, in response to the invocation of the function call on the computing platform;

wherein the determining includes:

checking for a false-positive designation of a memory region as tainted and checking for a false-negative designation of a memory region as untainted;

in response to determining that a memory region is falsely designated as tainted, designating the memory region as untainted; and in response to determining that a memory region is falsely designated as untainted, designating the memory region as tainted; and outputting data indicative of the function call being unauthorized in response to determining that the argument references a tainted memory region.

2. The method of claim 1, further comprising performing a user-specified action in response to determining that the argument references a tainted memory region.

3. The method of claim 1, wherein the received data set includes data read from a data file on a persistent storage device coupled to the computing platform.

4. The method of claim 3, wherein the received data set includes data read from a data file on a persistent storage device coupled to the computing platform via a network.

5. The method of claim 1, wherein the first-type operations include machine instructions.

6. The method of claim 1, wherein the first-type operations include functions from a software library.

7. The method of claim 6, further comprising:

storing in an accumulated character string set, the received data in response to the received data set being a character string;

wherein the step of designating a destination region as tainted includes, in response to the source region not overlapping a tainted memory region, determining whether contents of the source region match a string in the accumulated character string data set, and in response to the contents of the source region matching a string in the accumulated character string data set, designating the destination region as a tainted memory region.

8. The method of claim 7, further comprising:

storing a copy of the received data set in an accumulated-input data set that is separate from the tainted memory region;

wherein the step of designating a destination region as tainted includes, in response to the source region not overlapping with a tainted region and the contents of the source region not matching any string in the accumulated-string data set, determining whether the contents of the source memory region match a substring of those of any member of the accumulated-input data set, and in response to the contents of the source memory region matching a substring of a member of the accumulated-input data set, designating the destination memory region as tainted.

9. The method of claim 8, further comprising:

storing in the accumulated character string set, a character string argument that is passed as an argument to a second-type operation, in response to an invocation of the second-type operation on the computing platform and in response to at least a portion of an address range occupied by the character string argument overlapping a tainted memory region, wherein the second-type operation does not copy the character string argument to a destination region;

in response to no portion of the address range occupied by the character string argument overlapping a tainted memory region, determining whether the character string argument matches a string in the accumulated character string data set; and in response to the character string argument matching a string in the accumulated character string data set, designating a memory region occupied by the character string argument as tainted.

10. The method of claim 9, further comprising:

in response to, invocation of the second-type operation with the character string argument on the computing platform, no portion of an address range occupied by the character string argument overlapping a tainted memory region, and the character string argument not matching any string in the accumulated character string data set, determining whether the character string argument match a substring of a member of the accumulated input data set, and in response to the character string argument matching a substring of a member of the accumulated input data set, designating the memory region occupied by the character string argument as tainted.

11. The method of claim 8, further comprising:

wherein designating as a tainted memory region, each memory region to which a received data set is stored in response to the received data set being received includes storing a socket descriptor for a socket over which the received data set was received;

in response to a network send function call for which data to be sent over a first socket occupies at least part of a tainted memory region and the first socket is different from the socket descriptor of the tainted memory region, designating the invocation of the network send function call as unauthorized.

12. The method of claim 8, further comprising:

wherein the step of designating a destination region as a tainted memory region includes, comparing the contents of the source region to the members of the accumulated-input data set, in response to the contents of the source region not matching any member of the accumulated-input data set, removing designation of the source memory region as a tainted memory region, and not designating the destination region as tainted.

13. The method of claim 8, further comprising:

storing in the accumulated character string set, a character string argument that is passed as an argument to a second-type operation, in response to an invocation of the second-type operation on the computing platform and in response to at least a portion of an address range occupied by the character string argument overlapping a tainted memory region, wherein the second-type operation does not copy the character string argument to a destination region;

while operating in either of a first or second user-selectable mode, in response to no portion of the address range occupied by the character string argument overlapping a tainted memory region, determining whether the character string argument matches a string in the accumulated character string data set, and in response to the character string argument matching a string in the accumulated character string data set, designating a memory region occupied by the character string argument as tainted;

in response to, invocation of the second-type operation with the character string argument on the computing platform, no portion of an address range occupied by the character string argument overlapping a tainted memory region, and the character string argument not matching any string in the accumulated character string data set, and while operating in the second user-selectable mode, determining whether the character string argument matches a substring of a member of the accumulated input data set, and in response to the character string argument matching a substring of a member of the accumulated input data set, designating the memory region occupied by the character string argument as tainted.

14. The method of claim 8, further comprising:
wherein at least one of the first-type operations converts the contents of the source memory region to a destination numeric value and stores the destination numeric value in the destination region;
in response to the address range of the source memory region overlapping a tainted memory region, storing the destination numeric value in a set of tainted values;
in response to the contents of the source memory region matching a member of the accumulated character string set, storing the destination numeric value in a set of tainted values; and
wherein the determining whether an argument in an invocation of a function call references a tainted memory region includes,
determining whether a value of an argument of the function call matches a member in the set of tainted values, and in response to the value of the argument of the function call matching a member in the set of tainted values designating the invocation of the function call as unauthorized.

15. The method of claim 14, further comprising:
wherein at least one of the first-type operations converts a source numeric value to a destination numeric value and stores the destination numeric value in the destination region; and
in response to source numeric value being equal to a member of the set of tainted values, storing the destination numeric value in the set of tainted values.

16. The method of claim 1, wherein at least one first-type memory operation includes two or more destination arguments that respectively specify two or more destination memory regions and the at least one the first-type operation uses data from the source region to update each of the two or more destination regions, and the step of designating a destination region as a tainted memory region includes designating each of the two or more destination memory regions as tainted in response to and at least a portion of an address range of the source region overlapping an address range of a tainted memory region.

17. The method of claim 6, further comprising:
in response to the received data set being a character string, generating a hash value from the contents of the received data set, and storing in association with the hash value address information that describes the memory region to which the received data set is stored;
wherein the step of designating a destination region as tainted includes,
in response to the source region not overlapping a tainted memory region, generating a source hash value from the contents of the source region and determining whether address information descriptive of the source region is stored in association with the source hash value; and
in response to address information descriptive of the source region being stored in association with the source hash value, designating the destination region as a tainted memory region.

18. The method of claim 1, wherein the function call is at least one of a file management system call, process management system call, registry viewing system call, registry editing system call, and network interaction system call.

19. The method of claim 1, further comprising:
setting an operating mode to one of a first mode or a second mode;
wherein in response to the operating mode being the second operating mode, the determining includes the checking for a false-positive designation and the checking for a false-negative designation; and
wherein in response to the operating mode being the first operating mode, the determining bypasses the checking for a false-positive designation and the checking for a false negative designation.

20. A system for detecting unauthorized actions on a computing platform, comprising:
one or more processors;
a memory arrangement coupled to the one or more processors, wherein the memory arrangement is configured with instructions that when executed by the one or more processors cause the one or more processors to perform the steps including:
designating tainted memory regions, wherein each tainted memory region has stored therein a received data set being received from an untrusted source;
designating a destination region as a tainted memory region in response to an invocation of a first-type operation on the computing platform, the invocation including at least first and second arguments to the operation, wherein the first argument references a source memory region and the second argument references the destination memory region, and at least a portion of an address range of the source region overlaps an address range of a tainted memory region, and the first-type operation uses data from the source region to update the destination region;
determining, responsive to an invocation of a selected function call, whether an argument in the invocation references a tainted memory region;
wherein the determining includes:
checking for a false-positive designation of a memory region as tainted and checking for a false-negative designation of a memory region as untainted;
in response to determining that a memory region is falsely designated as tainted, designating the memory region as untainted; and
in response to determining that a memory region is falsely designated as untainted, designating the memory region as tainted; and
designating the invocation of the function call as unauthorized in response to determining that the argument references a tainted memory region.

21. A system for detecting unauthorized actions on a computing platform, comprising:
one or more processors;
a memory arrangement coupled to the one or more processors, wherein the memory arrangement is configured with instructions that when executed by the one or more processors cause the one or more processors to perform the steps including:
designating tainted memory regions responsive to data received over an input-output channel being written in the memory regions;
detecting propagation of data from a tainted memory region to an untainted memory regions and for designating the untainted memory region as tainted responsive to the propagation of data from a tainted memory region;
interposing calls to selected program-callable function calls and determining whether an argument in a call references a tainted memory region;
wherein the determining includes:
checking for a false-positive designation of a memory region as tainted and checking for a false-negative designation of a memory region as untainted;

in response to determining that a memory region is falsely designated as tainted, designating the memory region as untainted; and in response to determining that a memory region is falsely designated as untainted, designating the memory region as tainted; and outputting data indicative of the function call being unauthorized in response to determining that an argument references a tainted memory region.

* * * * *